United States Patent [19]

Saulsbury

[11] Patent Number: 5,801,757

[45] Date of Patent: Sep. 1, 1998

[54] INTERACTIVE COMMUNICATION DEVICE

[76] Inventor: Ashley Neville Saulsbury, 2 Tr, Kronborgsgrand 8, 16446 Kista, Sweden

[21] Appl. No.: 211,076

[22] PCT Filed: Sep. 18, 1992

[86] PCT No.: PCT/GB92/01730

§ 371 Date: May 16, 1994

§ 102(e) Date: May 16, 1994

[87] PCT Pub. No.: WO93/06686

PCT Pub. Date: Apr. 1, 1993

[30] Foreign Application Priority Data

Sep. 19, 1991 [GB] United Kingdom ............... 9120032

[51] Int. Cl.$^6$ ................................................ H04N 7/14
[52] U.S. Cl. ........................ 348/17; 379/93.08; 345/331
[58] Field of Search ........................... 348/13, 14, 15, 348/16, 17, 18, 19, 552; 379/96, 93, 97, 98, 100, 93.01, 93.19, 93.17; 364/514 A; 395/330–332; 370/260, 263; 345/173, 330–332

[56] References Cited

U.S. PATENT DOCUMENTS

| Re. 31,182 | 3/1983 | Crager et al. | 178/3 |
|---|---|---|---|
| 3,601,530 | 8/1971 | Edson | 348/15 |
| 3,912,860 | 10/1975 | Sasabe et al. | 348/17 |
| 4,100,377 | 7/1978 | Flanagan | 179/15 |
| 4,630,263 | 12/1986 | Callens et al. | 370/81 |
| 4,659,876 | 4/1987 | Sullivan et al. | 379/96 |
| 4,897,835 | 1/1990 | Gaskill et al. | 370/94.1 |
| 4,994,912 | 2/1991 | Lumelsky et al. | 348/552 |
| 5,003,532 | 3/1991 | Ashida et al. | 348/15 |
| 5,005,168 | 4/1991 | Cummiskey et al. | 370/24 |
| 5,023,869 | 6/1991 | Grover et al. | 370/84 |
| 5,073,926 | 12/1991 | Suzuki et al. | 348/17 |
| 5,164,980 | 11/1992 | Bush et al. | 348/17 |
| 5,300,943 | 4/1994 | Jakobs et al. | 345/173 |
| 5,363,507 | 11/1994 | Nakayama et al. | 395/330 |

FOREIGN PATENT DOCUMENTS 0338075 10/1989 European Pat. Off. ........ H04M 11/00

OTHER PUBLICATIONS

Campbell et al., "Voice/Unvoiced Classification of Speech with Applications to the U.S. Government LPC–10E Algorithm" ICASSP 86, Tokyo, pp. 473–476 (1986).

Rabiner et al., "Voice–Unvoiced–Silence Detection Using the Itakura LPC Distance Measure," IEEE ICASSP, pp. 323–326 (1977).

Zinser, "An Efficient Pitch–Aligned High–Frequency Regeneration Technique for RELP Vocoders, " IEEE ICASSP, pp. 969–972 (1985).

Miyamoto et al. Single DSP 8kbps Speech Codec, ICASSP 86 Tokyo, IEEE (1986).

Motorola Semiconductor Technical Data Sheet MC68HC11A0.

Motorola Semiconductor Techinical Data Sheet MC68331.

Data Sheet for Texas Instrument TMS320 digital signal proccessor.

Data Sheet for Toshiba TLCS Z80 Microprocessor.

*Primary Examiner*—Curtis A. Kuntz
*Assistant Examiner*—Stephen W. Palan
*Attorney, Agent, or Firm*—Dellett and Walters Stoel Rives LLP

[57] ABSTRACT

Two devices are connected via a single analogue signal path such as a public telephone line in such a manner as to permit the users to talk to each other while interactively modifying an image which is presented to both users simultaneously. Each device multiplexes a reduced voice signal, e.g. from a vocoder 3, with a control signal indicative of changes to make to the image, and transmits the composite signal via a modem 4. The devices either respond to both image signals to modify the image (e.g. if they are word processors responding to key presses) or to the same selected one of the signals as determined by a protocol (e.g. if a spreadsheet is being altered by only one user at a time). Each device may be stand alone, such as incorporating a computer or facsimile machine, or an adaptor for existing such machines; it may be inserted between a telephone set and the line, or have separate audio transducers and connect to the line via a telephone set.

45 Claims, 7 Drawing Sheets

INTERACTIVE COMMUNICATION DEVICE

This application claims priority under 35 USC Section 365(c) from application no. PCT/GB92/01730, filed on Sept. 18, 1992, which, in turn, claims priority under 35 USC 365(c) from United Kingdom application 9120032.9 filed Sep. 19, 1991.

The public switched telephone network (hereafter referred to as "PSTN") provides a means of direct and immediate communication of an audio signal between two points. This is typically used to allow two or more people in different places to hold a conversation.

Aside from the transference of sound, there are currently devices which utilize the PSTN to transfer information and images, such well known devices include computer modems and facsimile (fax) machines. These devices make full use of the telephone line to transfer documents or information other than voice.

As an alternative to the analog PSTN, the Integrated Services Digital Network (or "ISDN") enables computers and other digital equipment to communicate and transfer digital information between different places. The information capacity of this network is sufficiently high that simultaneous voice communication and computer communication is possible. Currently devices utilize the information capacity provided by an ISDN connection to allow such cooperative working tools as video conferencing.

However, the cost to the subscriber of ISDN services is relatively expensive. In addition, the availability of ISDN connections is not as wide spread as the older analog PSTN.

There is a need for people in different places to be able to discuss and visually manipulate documents and other information using a cheap readily available communication connection such as that provided by the PSTN.

The invention enables people in two different places to use a single analog signal path such as a PSTN telephone line connection for the purpose of simultaneously:

Transferring information back and forth, and manipulating information in full view of the other parties, and Maintaining a conversation.

Other single analogue signal paths, including lines of private telephone networks, may be used. The bandwidth of such paths may differ from that of the PSTN (about 3 KHz), e.g. may be greater.

An embodiment of a device according to the invention comprises a means of digitizing voice or sound from a user, compressing and merging that sonic information with other information and actions digitizing from the user, and sending the combination of information, through the use of a modem circuit, down a single analog PSTN telephone line. While sending as just described, the device may also receive similar combination information from the same telephone line, split it, decompress and replay the sound information to the user(s), and also pass on the other digitised information in an appropriate manner. Thus there is provided a means of transferring and remotely manipulating documents, diagrams, and other information over a single analog telephone line which may also simultaneously be used to hold a conversation.

Put simply, any document (containing text, numbers, equations, graphical information, or mathematical equations), can be transferred, discussed, edited and manipulated by two (or more) parties as a collaborative effort, while always maintaining a voice conversation. Each user effectively hears the other and sees the actions of the other(s) as they occur, almost as if the users were working over the same desktop.

No special service need be required from the telephone service provider other than, a normal single analog connection to the PSTN to which a device according to the invention may be attached.

Documents and material transferred, discussed and manipulated may be in full colour as well as monochrome.

The invention may provide a complete electronic device or system which provides the facilities described, or a device (or devices) for adapting an existing computer, facsimile or other visual display system to provide the facilities described.

The invention provides an interactive communication device comprising transceiver means, said transceiver means including:

(a) combining means for receiving a first audio signal and a first image determining signal and for combining them to produce a composite analogue output signal for transmission to a second interactive communication device, and (b) means for receiving a composite output signal of like form and for producing therefrom a second audio signal and a second image determining signal, said device further comprising visual display means and control means coupled to receive said first and second image determining signals and to control said visual display means to produce an image determined at least in part by a selected one or both said image determining signals, characterized in that said combining means is arranged to combine said first audio signal and said first image determining signal to produce a digital composite signal, and comprises a modem for converting said digital composite signal to said analogue composite signal.

The latter may be a stand alone device, but the invention also provides an interactive communication device for use with an existing device which has visual display means, determining means for producing a first image determining signal, and control means coupled between said determining means and said display means and responsive to said first determining signal to control an image displayed on the display means, said interactive communication device providing an interface for adapting said existing device for cooperative audio visual use with another device, and comprising transceiver means including:

(a) combining means for insertion between said determining means and said control means for accepting said first image determining signal and combining it with a first audio signal to produce a composite analogue output signal for transmission to a second interactive communication device, and (b) means for receiving an analogue signal of like form and producing therefrom a second audio signal and a second image determining signal, said interactive communication device being adapted to supply said second image determining signal to said control means with, or selectively instead of, said first image determining signal, characterized in that said combining means is arranged to combine said first audio signal and said first image determining signal to produce a digital composite signal, and comprises a modem for converting said digital composite signal to said analogue composite signal.

There may be audio transducer means such as a telephone handset coupled to said interface means for converting sound to said first audio signal and converting said second audio signal to sound. Alternatively the interactive communication device may be adapted for coupling between a telephone set and a telephone line, whereby said first and second audio signals are coupled from and to the telephone set respectively; in this case a by-pass may be selectively operable (for example, in response to a manual operation performed at the device and/or in response to signals received by said transceiver means) to make the device appear transparent to said telephone set.

There may be at least one ancillary transducer, which may be manually operable, for providing said image determining signal, and the latter may be converted by said visual control means to alterations in the image displayed by said visual display means.

At least one further ancillary transducer may be present, and means for selecting which ancillary transducer provides said image determining signal. The further ancillary transducer may comprise generator means for generating a signal representative of an image, such as (a) means for scanning an original image (possibly a facsimile machine), and/or (b) computing means, e.g. capable of providing a computer aided spread-sheet, word processing, drawing, management or design function, or other like computer aided visual function, and/or (c) means for generating a said representative signal corresponding to an image of predetermined form, or a blank image and/or (d) storage means for storing a said representative signal. The image determining signal may contain an indication as to which ancillary transducer is providing the image determining signal, said control means being responsive to said indication to control said visual display means accordingly.

The transceiver means may include compression means for compressing said first audio signal before it is combined with said first image determining signal, and means for decompressing said second audio signal. Compression and decompression may be adapted for a voice audio signal.

The first image determining signal and said first audio signal may be, or may be converted to, respective digital signals, said compression means including means for performing data reduction on said digital first audio signal, and said combining means including multiplexing means for multiplexing the digital image determining signal and the digital data reduced first audio signal.

The modem may be coupled to said multiplexer/demultiplexer for producing said analogue output signal and for receiving said like analogue signal.

The rate of transmission of said first image determining signal may be adaptively dependent on said compressed first audio signal.

The data reduction may include coding for silence when the level of the first (transmitted) audio signal falls below a threshold level for more than a predetermined period, and this may be reconverted to white noise or other background signal at a receiver.

There may be means for adaptively controlling the rate of transmission of said composite signal, and/or for adaptively controlling the degree of compression afforded by said compression means.

Erroneous parts of the second (received) audio signal may be detected and replaced by a secondary signal such as one based on the recently received second audio signal.

There may be selection means for selectively coupling one of said first and second image determining signals to said control means, although for certain applications, e.g. word processing where key presses from both parties may be fed to the control means, this may not be required.

The selection means may be manually controllable, or include logic means for determining when either of said first and second image determining signals become operative (that is, capable of discernibly affecting the displayed image) and for selectively coupling the first one of said image determining signals to become operative to said visual control means until it has ceased to be operative. Determination of whether a signal is operative may be accomplished according to whether it has changed by more than a predetermined amount over a predetermined period of time, and/or by determining when a said image determining signal has fallen within a predetermined range for a predetermined period of time.

At least one of the predetermined period of time, the predetermined amount and the predetermined range may be subject to adaptive control, for example as a function of the past frequency of selection of the first and second image determining signals in the case of the predetermined period of time, or as a function of the characteristics of the image determining signals such as rate of change. At least one of the predetermined period of time, the predetermined amount and the predetermined range may be selected by the user. For long line delays, the users may be able to transfer control manually.

The transceiver means may be coupled to the selection means and may modify the composite output signal to provide an indication as to which of the input and output image determining signals is selected. The supply of the first image determining signal to the transceiver means may be inhibited when the second image determining signal is selectively coupled to the control means.

When the device is intended for adapting an existing visual device such as a computer or facsimile machine, there may be by-pass means for selectively rendering the interface transparent to the existing device. When the existing device is of the sort where the image determining signals comprise control signals denoting an alteration or manipulation to be performed on said image (as from a mouse, keyboard, digitizing tablet, data glove or light pen, for example, so that the control signals are indicative of an operation performed as opposed to direct pixel information relating to the displayed image), or where a stand alone device produces or uses such signals, said transceiver means is adapted to accept said first image determining signal and to produce said second image determining signal.

When the device is a stand alone device, the control means may include means for storing information relating to an image field, and means for controlling said display to show a sub-image falling within said image field, as with a spread sheet or word processor, for example, where a change in said sub-image is effective to cause consequential alteration in the rest of said image field.

Means may be provided for producing a hard copy containing said image.

The invention also provides an audio visual system comprising at least two interactive communication devices each as described above with their transceiver means coupled to allow transmission of said composite analogue signals therebetween, whereby changes effected in the display associated with one device may be detected and copied on the display associated with the other device(s).

Specific embodiments of the invention will now be described with reference to the accompanying drawings, in which.

EXAMPLE 1

The embodiment in this Example is: a circuit board (hereafter referred to as "the Board") to be connected to a computer system (hereafter referred to as "the Host" or "the Host Computer"), and appropriate software to operate the Host Computer in conjunction with the Board. Exemplary Host Computer systems include the Apple Macintosh, the IBM XT, PC, or AT, and the Sun SPARC station.

Aside from the exact specification of the electrical connection to the Host computer (the "Host interface"), the Board design and implementation is independent of the choice of the Host computer.

The Host Computer provides a means of: collecting commands, directions and information from the user and presenting them to the Board, and also collecting information from the Board, and presenting that to the user in a comprehensible form.

The Host computer will have a visual display unit ("VDU") with which to present visual information to the user, the user can see the document or other information being manipulated upon the VDU. The Host Computer will also have a means of collecting data and directions from the user. To perform the latter, devices attached to the Host such as a keyboard, a mouse, a light-pen, a digitising tablet, document scanner, video digitiser or a data glove may be used. In this Example, the software provides the interactive functionality in conjunction with the "Board".

The Board digitises and compresses voice and sound information from the user, combines this with the data presented by the host computer, and transmits this combination to a compatible system down a telephone line, those skilled in the art will recognize the data presented by the host to be accurately termed as document-and-display determining signals. This data includes user annotations such as, for example, cursor motions which do not form a part of the document itself. The Board also receives information from the other party connected to by the telephone line. The digitised compressed voice received is replayed to the user, and the commands and data received are passed on to the software in the host computer. The software in the host computer interprets this data as commands or document data from the other party.

The Board in this Example collects and replays analog sounds through the use of a standard telephone handset which can itself be connected directly to the PSTN telephone line.

Figure 1:
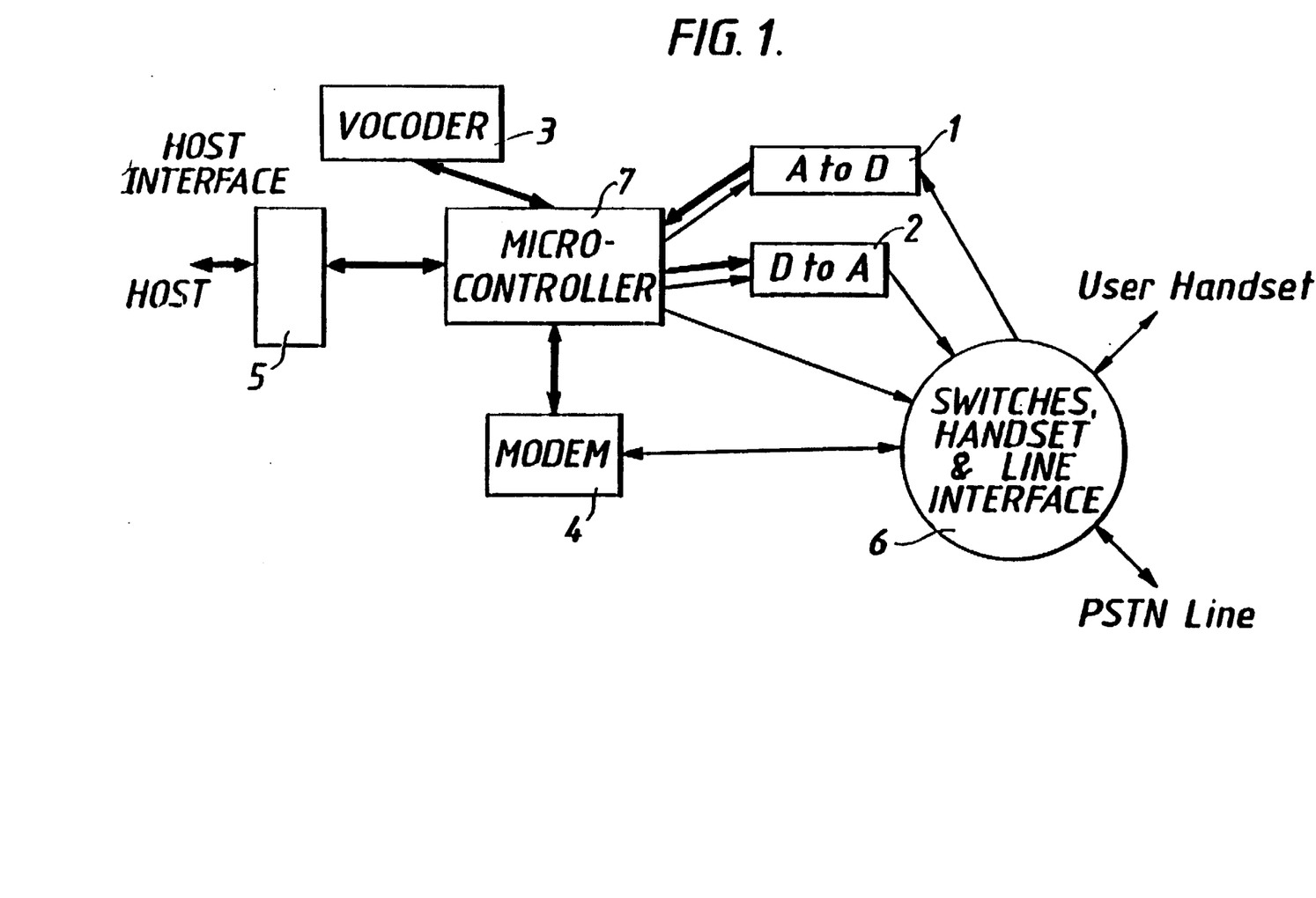
FIG. 1 shows the general arrangement of a first embodiment of a device according to the invention (Example 1).

For the purpose of this Example and as illustrated in FIG. 1, the Board can logically be divided into seven component parts, (however, someone skilled in the art may be able to combine one or more components into a single entity, or decompose any component into subcomponents).

The component parts depicted in FIG. 1 are shown in more detail in FIGS. 2 to 8, which are described below.

Figure 2:
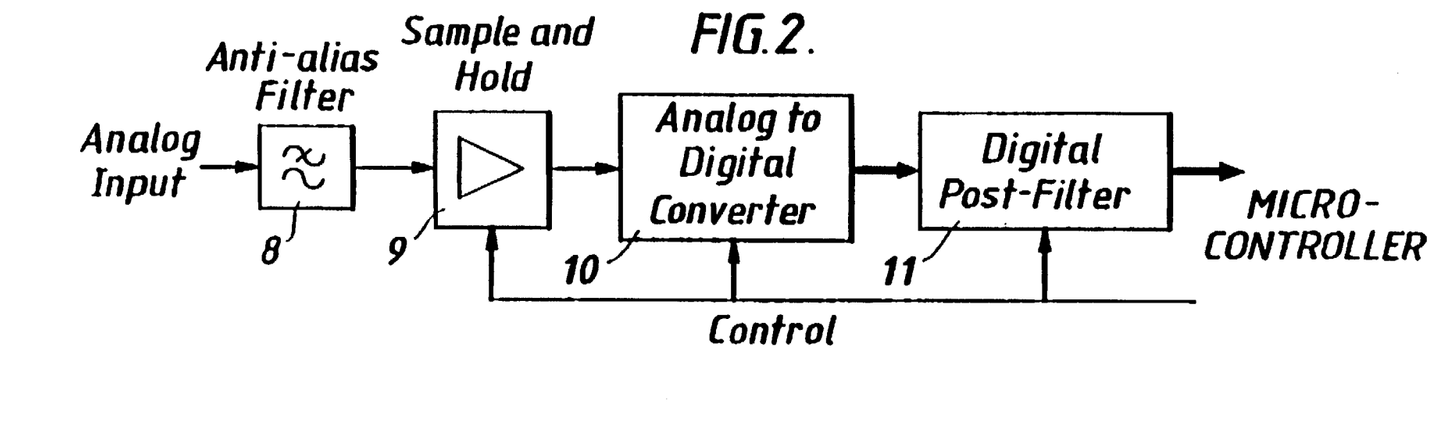
FIG. 2 shows the analog to digital conversion circuit 1 of FIG. 1.

The Analog to Digital Conversion Circuit (FIG. 2)

This circuit converts the analog voice signal of the user into a digital form. The circuit takes a varying analog voltage, which represents the users voice (or other sounds) and produces a digital output which represents the analog input.

The circuit could employ the use of an analog pre-filter circuit 8 to provide cleaning and enhancement on the analog signal before conversion (for example antialias filtering, perhaps using a second order Sallen-Key filter configuration). Following, this if required by the analog to digital converter, a sample and hold circuit 9. Numerous techniques for analog to digital conversion 10 are available using such methods as successive approximation, flash conversion, or modified slope adaptive interpolation.

Following the conversion to digital form ("sampling") the digital representation of the analog signal may be further filtered or manipulated digitally 11 to provide suitable data for the Voice Compression circuit.

For the purpose of this Example, the analog to digital converter circuit would provide 8000 conversions (or "samples") per second, with each sample providing 12 or more binary bits of resolution. This provides sufficient resolution for the Voice Compression circuit to compress the voice signal and maintain a reasonable quality of voice communication.

Figure 7:
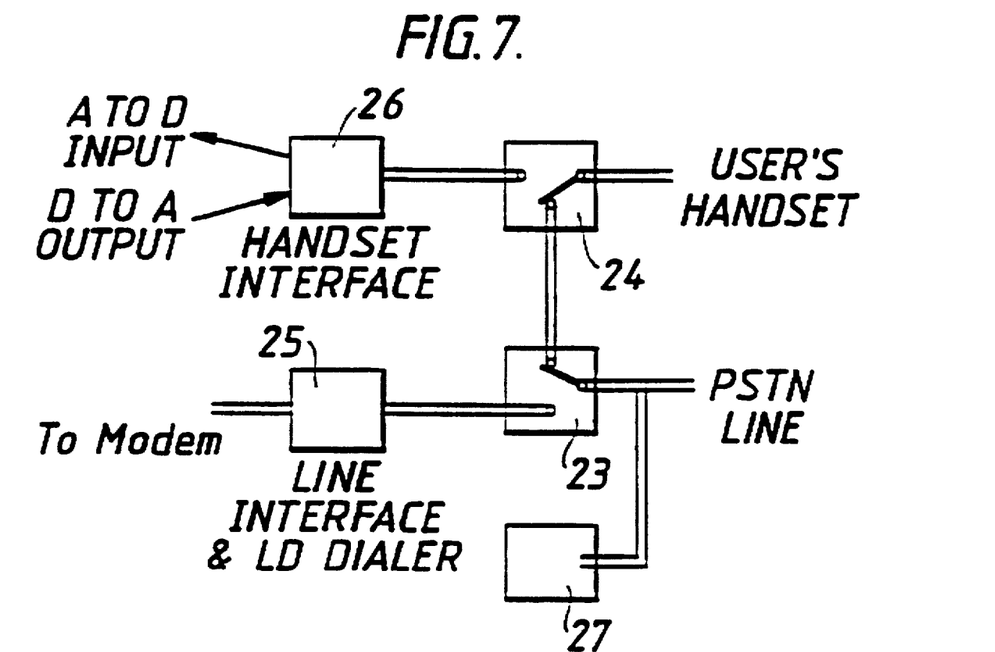
FIG. 7 shows a second embodiment of the PSTN line interface, telephone handset interface, and switch circuit 6 of FIG. 1.

In this Example the analog input waveform is provided by the telephone handset interface 26 when connected via the switch circuit 24.

Figure 3:
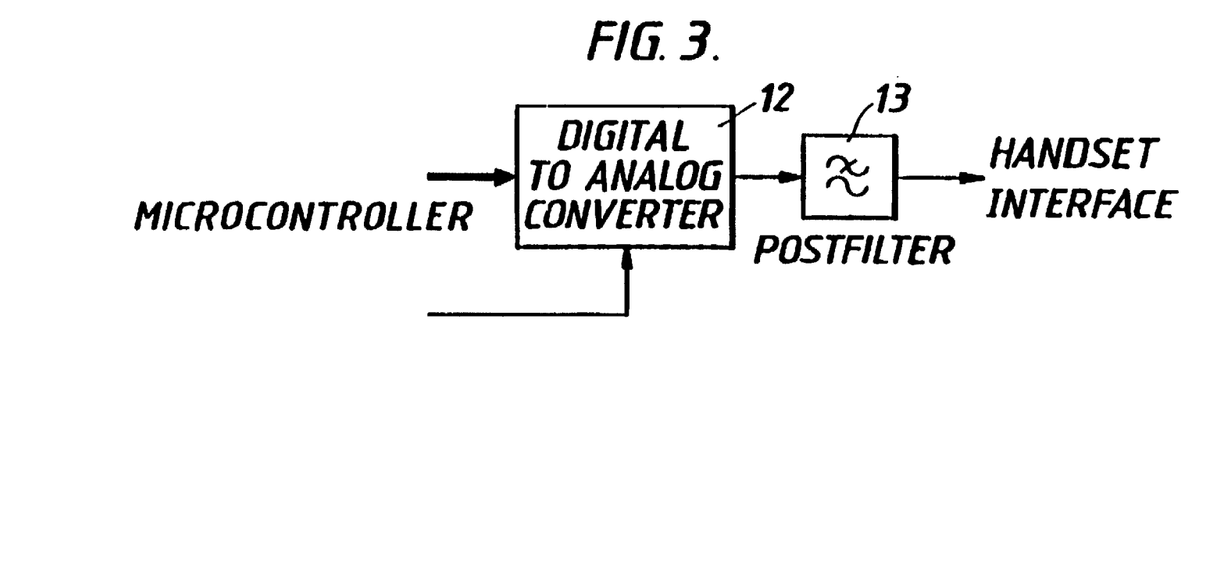
FIG. 3 shows the digital to analog conversion circuit 2 of FIG. 1.

The Digital to Analog Conversion Circuit (FIG. 3)

The purpose of the digital to analog conversion circuit is to convert decompressed digital voice data (produced by the Voice Compression Circuit), back into an analog waveform. The digital to analog conversion can be followed by an analog circuit to clean and enhance the converted waveform, such a circuit could be a smoothing post filter circuit.

The analog output from the Analog to Digital Conversion circuit provides a signal for the user to hear, and therefore maybe connected to the telephone handset interface via the switch circuit.

Figure 4:
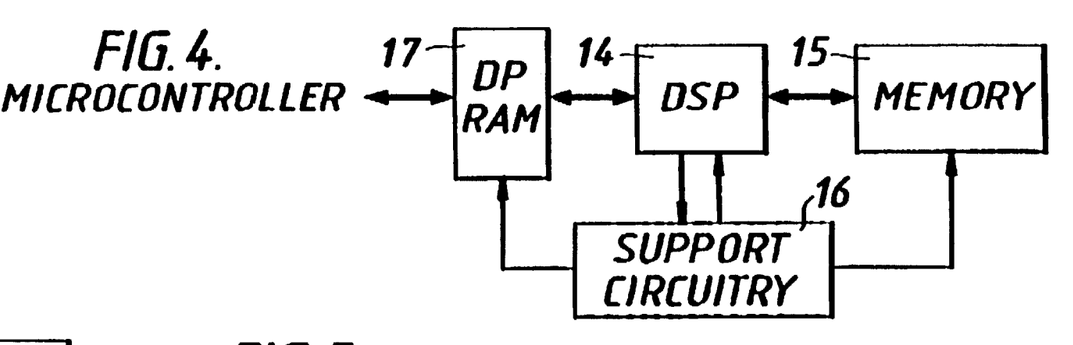
FIG. 4 shows the voice compression and decompression circuit 3 of FIG. 1.

The Voice Compression and Decompression Circuit (FIG. 4)

The Voice Compression and Decompression circuit 3 (the "vocoder") encodes (or codes) voice samples into a smaller representative sequence of data which can be transmitted down a telephone line by a modem.

Typically the analog to digital conversion 1 and digital to analog conversion circuits 2 process between 64 kbps and 128 kbps each. (the exact amount of data is calculated by the formula: \$<\$resolution in bits of each sample\$>\$ \$*\$ \$<\$samples per second\$>\$). This amount of a data must be compressed down to a data rate which can be reliably transmitted using the Modem Circuit 4 down a telephone line. For this Example a data rate for the compressed voice information of between 4.2 kbps and 9.2 kbps is suitable.

With the high degree of compression required, the vocoder circuit cannot precisely code the sampled voice data, rather it tries to code enough information which when decompressed by the receiver's vocoder produces a representative audio signal.

The exact data rate achievable by the Modem Circuit partly depends on the quality of the telephone connection provided by the PSTN service. For this reason the degree of compression achieved by the vocoder circuit is variable to suit the rate transferrable by the Modem Circuit, and may be dynamically altered during operation of the circuit to take account of fluctuations in the data transfer rate achieved by the Modem Circuit.

The vocoder will both compress and decompress digital voice information.

Figure 8:
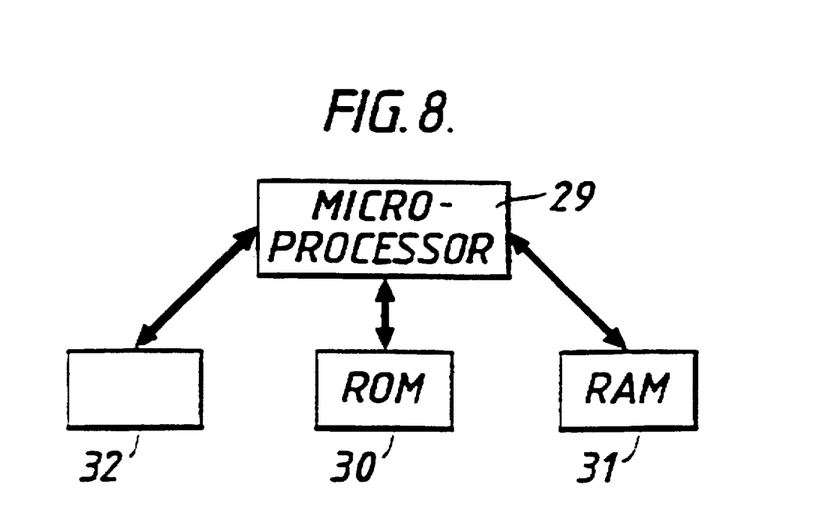
FIG. 8 shows the microcontroller circuit 7 which operates and coordinates the other circuits on the Host Board.

The vocoder circuit in this Example interacts with the Microcontroller 7 in the following way:

The Microcontroller circuit in this Example passes sampled data from the Analog to Digital converter 1 to the vocoder for compression.

The Microcontroller collects compressed data, and status information indicating such things as silence, from the vocoder.

The Microcontroller passes compressed audio data, and other control information such as the required degree of compression, or the method of compression to utilise, to the vocoder.

The Microcontroller collects decompressed or generated audio samples from the vocoder and passes them to the digital to analog converter 2.

The vocoder in this Example may be embodied by: a Digital Signal Processor ("DSP" microprocessor) 14 which manipulates the sampled voice data under the control of a program, appropriate program and data memory 15, support circuitry 16 for the DSP to operate, and the interface 17 to the Microcontroller Circuit through which the vocoder exchanges compressed and decompressed digital voice information, control and status information.

The method of voice compression (and decompression) implemented by the vocoder is a form of Code Excited Linear Prediction ("CELP"). Other techniques for audio (or just voice) sampled data compression, such as Adaptive Differential Pulse Code Modulation ("ADPCM"), may be implemented by the vocoder circuit, this can be achieved by the Microcontroller altering the controlling program in the DSP, or instructing the controlling program in the DSP to use a different compression technique.

The CELP compression technique operates on a sequence (or "frame") of audio samples, for example a frame containing 50 milliseconds of sound samples. The size of frame used by the vocoder may vary. From a frame of audio samples, a representative sequence of codes is produced. When the vocoder is given a received sequence of codes to decompress it uses them to re-create a frame of audio samples representing a waveform similar to that originally compressed.

The time taken to compress and decompress a frame must be less than the time actually represented by the frame. Also, the time taken to transmit the compressed frame codes by the Modem Circuit 4 must be less than the actual length of the frame.

Similarly the total time taken to; accumulate a frame, compress the frame, decompress the frame, and replay the frame must be relatively short so that a reasonable conversation can be maintained.

As a part of its function in this Example, the vocoder circuit 3 is able to detect the presence of voice and indicate this in its status information given to the Microcontroller 7. If no significant audio signal is given to the vocoder to compress, (for example if the user is not speaking — i.e. "silence") the vocoder can detect this silence. The silence detection can be achieved for example by determining whether or not the amplitude of the digitised audio waveform ever reaches above a certain threshold value within a given time period (say 1/10th of a second) — if not the sampled audio signal is considered to be silence. The vocoder can be sensitive enough to detect gaps of silence between words.

Once silence has been detected, it is important that the vocoder responds quickly to any subsequent significant audio signal (such as the start of a spoken word). Detection of the start of speech (after a period of silence) may be achieved in the vocoder by for example, waiting for the first audio sample to reach above a certain threshold value.

The silence detection can be utilised by the Microcontroller, and instead of compressed audio data being transmitted, a data sequence indicating silence is sent.

When the vocoder is used to decode compressed audio data, the Microcontroller may, instead of handing compressed audio data to be decompressed to the vocoder, indicate a that a gap or period of silence has been detected. Usually it will not matter in such a circumstance if the vocoder produces a frame of sampled audio data representing complete silence. However, if the compressing part of the vocoder has also detected silence (ie neither the local nor the remote users are speaking), then the Microcontroller may request the vocoder to generate quiet crackle or white noise (for the local user) instead of complete silence — this is to comfort the user so that he or she will not worry about the connection being broken.

Another function of the vocoder in this Example, is the ability to cope with damaged compressed audio information. The data received by the Modem Circuit may be erroneous due to line noise or interference on the telephone connection. The Microcontroller can detect and if possible will try to repair faulty information. However if complete repair is not possible the Microcontroller will pass the received voice information to the vocoder indicating where possible which parts are valid. The vocoder circuit will try to make the best use of the valid compressed information to recreate a voice signal. The recreation can be achieved by mixing the undamaged coded voice information with previously received information and using this as a substitute for the complete coded voice information, or in the worst case where there is no valid voice information replaying a previously decoded voice signal frame.

The interface 17 between the Microcontroller and the vocoder is achieved in this Example by means of dual-port Random Access Memory, this is a memory bank which may be accessed simultaneously and independently by the vocoder's DSP 14 and the Microcontroller 7. The Microcontroller copies each frame of samples into this memory for compression, and copies out a compressed data sequence. Similarly the Microcontroller also copies in received data sequences for decoding, and copies out decoded frames of audio samples.

Other embodiments of the interface between the vocoder and Microcontroller may include:
first In First Out buffer circuits, or
simple data latches, and the use of interrupts on both the Microcontroller and the vocoder's DSP to handshake the transfer of data.

The Modem Circuit

The Modem Circuit 4 converts digital data into an analog audio signal suitable for transmission over a PSTN telephone line. The modem circuit is also (simultaneously) capable of receiving an analog audio signal from a compatible modem and converting it back into digital data.

The proposed Modem can achieves high data rates, and is capable of transmitting and receiving 9.6 kbps (or higher) simultaneously ("full-duplex") on the same communications line. The full-duplex capability enables the simultaneous transmission and receipt of (voice) data. Methods such as Frequency Shift Keying, Quadrature Amplitude Modulation, or Trellis Code Modulation may be used in the Modem Circuit to convert digital data to and from an analog signal.

On certain noisy communication connections the Microcontroller 7 will operate the Modem Circuit 4 at data rates below 9.6 kbps, and increase the degree of voice compression by the vocoder accordingly.

In this embodiment the Modem Circuit conforms to CCITT communications standards V.21, V.22, V.22bis, V.27, V.29, V.32 and V.32bis. Having a Modem Circuit 4 which conforms to these standards enables the Board to communicate with other standard communication devices such as computer modems and facsimile machines.

The Modem Circuit is connected via the line interface 25 and switch 23 (FIG. 7) to the telecommunications line. The line interface enables the attainment of certain electrical interface characteristics required by the telecommunications link provider.

The Modem Circuit also includes an High-level Data Link Controller (HDLC) circuit. This circuit provides facilities in hardware to error check and to synchronise the digital data transmitted and received by the rest of the Modem Circuit. For someone skilled in the art, the functionality of the HDLC circuit may be emulated in software by the Microcontroller.

The Modem Circuit can also generate the tones required for Dual Tone Multi-Frequency (DTMF) dialling. The Microcontroller can cause the Modem Circuit to dial a number.

Figure 6:
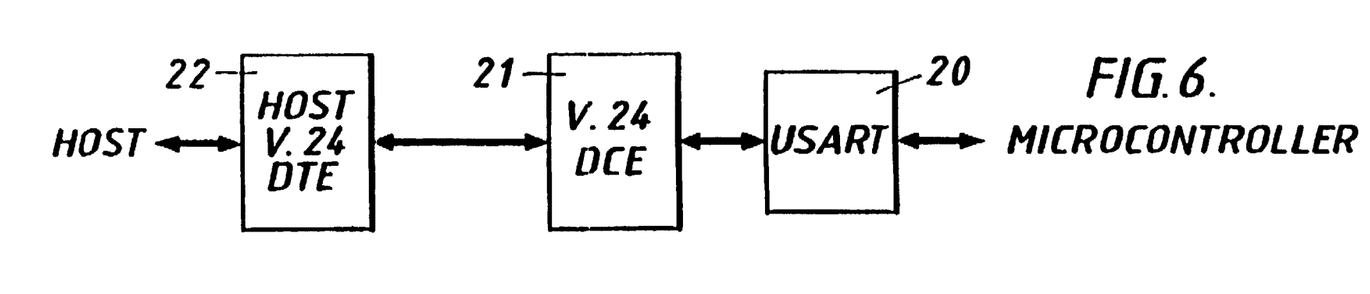
FIG. 6 shows the host interface circuit 5 of FIG. 1.

The Host Interface Circuit (FIG. 6)

This circuit enables the Host Computer to communicate with the Board.

Two distinct versions of the Board are envisaged: one to be fitted internally in a computer system the other to be fitted externally.

An embodiment (FIG. 5) of the Host Interface for an internally fitted Board is the use of Dual Port Random Access Memory ("DP RAM") 18. The DP RAM is connected to the interface bus of the Host computer, and also to the Microcontroller bus. Additional circuitry 19 enables the Microcontroller to assert an interrupt to the Host Computer. The microcontroller is programmed to emulate (through the DP RAM) a standard communications device which may be connected to the interface bus of the host computer. In this manner the Board may also be used as such a communications device (for example a high performance modem).

Figure 5:
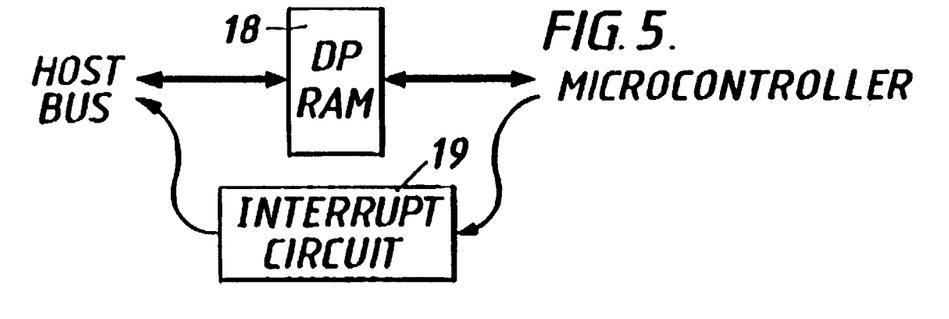
FIG. 5 shows a first embodiment of the host interface circuit 5

An alternative embodiment of the Host Interface for the internally fitted Board is the use of First In First Out buffer circuitry (FIFO's) to allow the asynchronous communication of data between Host and Microcontroller.

An embodiment (FIG. 6) of the Host Interface for an externally fitted Board is a Universal Synchronous and Asynchronous Receiver Transmitter ("USART") circuit 20 attached to the Microcontroller, and connected through a circuit 21 to provide the correct signalling levels for a Data Communications Equipment (DCE) V.24 (or RS232C) circuit attached to the Microcontroller. This enables the Board to connect to Host Computers which have the appropriate Data Terminal Equipment (DTE) V.24 interface externally 22.

The Telephone Line Interface, User Handset Interface, and Line Switch (FIG. 7)

This interface and switch circuit provides isolation of the device from the communications line (in order to conform to the PSTN service provider's requirements), and yet also switch the telephone line between the user's handset, and the Modem.

The switches 23 and 24 are operated by the Microcontroller.

When the device is not in use, or the power is disconnected, the default arrangement is for the telephone line to be directly connected to the user's handset. In this way the handset functions as a normal telephone.

When operating and connected via a telephone line to another Board or compatible device, the Microcontroller switches (using switch 23) the telephone line to the line interface 25, which in turn connects to the Modem Circuit 4. In addition the handset is connected (via switch 24) to the Handset Interface circuit 26 which provides power and the other necessary requirements to utilise the microphone and speaker in the handset as an input and output for the analog to digital conversion 1 and digital to analog conversion 2 circuits.

To dial a telephone number, the telephone handset may be used while it is connected to the telephone line, or the Microcontroller can:

Perform DTMF dialling by switching the telephone line to the Modem Circuit and instructing the Modem Circuit to generate the appropriate tones.

Perform Loop Disconnect ("LD") dialling, by using a switch in the line interface 25.

While in the idle state the telephone handset 28 is connected to the telephone line, and the Modem Circuit is disconnected. However, a ring detect circuit 27 is also connected to the telephone line (subject to approval by the PSTN service provider). If the telephone line asserts a ring signal, the handset 28 will naturally ring, but the Microcontroller is also informed of the ring condition.

Depending on what is allowed by the PSTN service provider, he microcontroller can perform a number of different unctions:

Ignore the ring, allowing a user to pick up the handset - as a normal telephone.

After a pre-determined number of rings, switch 23 the telephone line (via the line interface 25) to the Modem Circuit 4 (disconnecting the handset). The Microcontroller can then try, using the Modem Circuit, to connect to a fax machine, to a computer modem, or to the same type of device as itself. By the use of a Non Standard Feature sequence as described in the CCITT T.30 specification, the Board can make itself known for what it is, or still connect to a normal facsimile machine.

The Microcontroller Circuit (FIG. 8)

The Microcontroller circuit 7 controls the general operation of the board, and the flow of information through the board. The Microcontroller circuit comprises a microprocessor 29, program 30 and data 31 memory and other circuitry 32 which connects these components together, provides timing interrupts with which to operate the analog to digital and digital to analog circuits, controls the switches 23, 24 & 25, and senses the ring detect 27.

The main task of the Microcontroller is to collect data from the Host computer, combine this with compressed voice data from the vocoder, and transmit the combination through the modem. In addition the Microcontroller must also perform the reverse function simultaneously, that is, collect data from the Modem Circuit, separate the compressed voice data from the Host data, decompress the voice in the vocoder, and replay the voice signal to the user, and pass the Host data on to the Host Computer.

When transmitting data through the Modem circuit 4, the Microcontroller creates a data "packet" containing one frame of compressed voice data, some control information for the other Microcontroller, and as much data from the Host Computer as can be sent before the next voice frame is ready. Voice information always takes precedence over Host data information.

The transmitted data packet is provided a Cyclic Redundancy Check which will detect any errors. The Modem data connection is not fast enough to enable the re-sending of voice data, so the compressed voice data is partially protected by the use of Solomon-Reed error correcting codes, or hamming codes.

An error free Host to Host data connection is ensured by each Microcontroller which requests the re-sending of any Host data detected as being faulty from the other.

When the vocoder indicates that it has detected silence, the Microcontroller transmits through the Modem a special code indicating the start of silence instead of the compressed voice data. The extra room in each transmitted data packet is filled with Host data when the vocoder indicates silence. In this way the Microcontroller dynamically increases the Host to Host data rate during periods of silence.

The Microcontroller has the responsibility of sorting and storing data from the Host computer ready for transmission. The Microcontroller will transmit Host data even if it is insufficient to fill a complete data packet. The remainder of the packet is filled with null data.

With support from the Microcontroller the Board may be used also as a standard communications device such as an 'AT command set' compatible modem, or be capable of communicating with facsimile machines.

EXAMPLE 2

Figure 9:
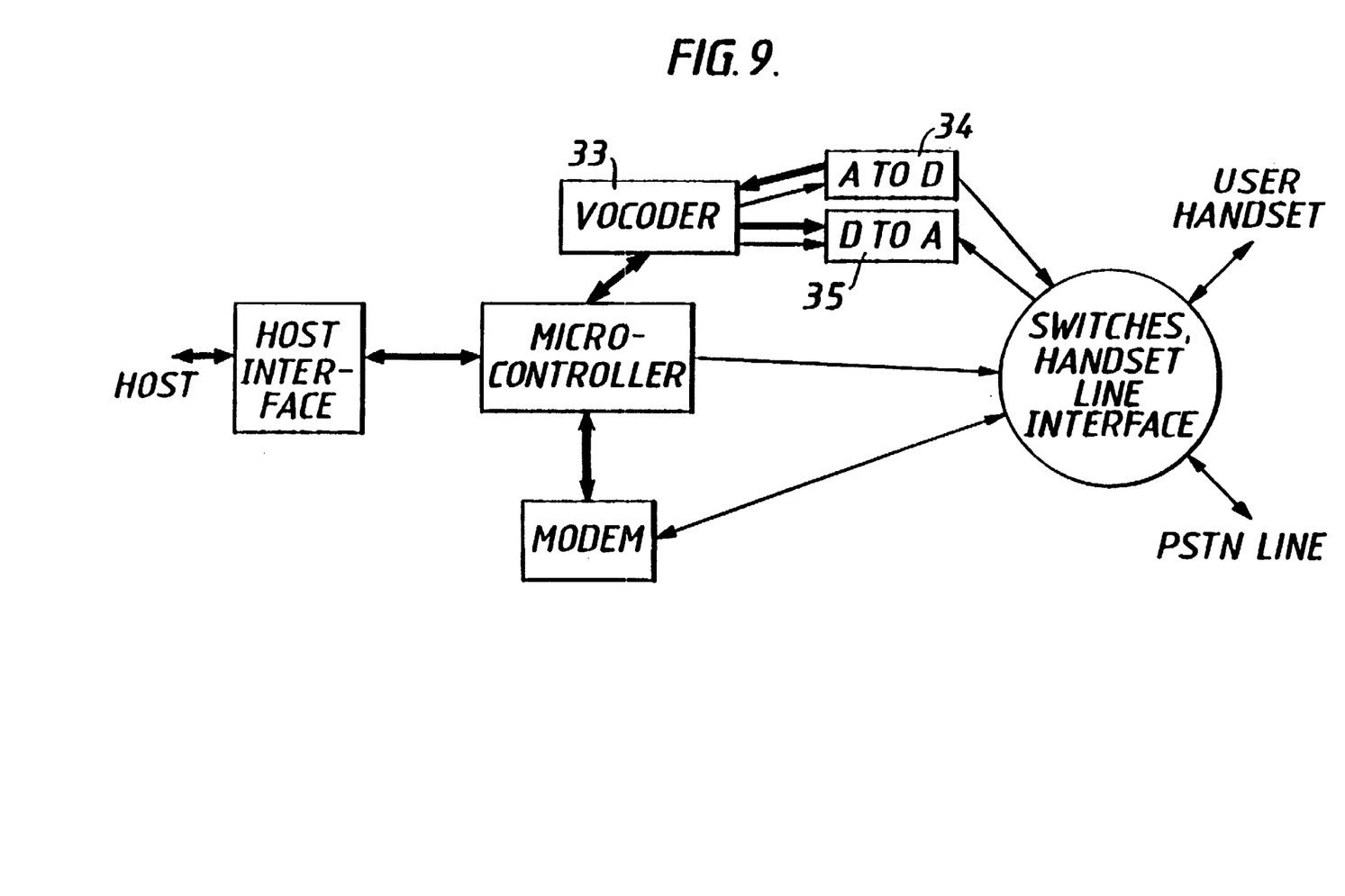
FIG. 9 shows a second embodiment of the invention (Example 2).

The arrangement of components on the Board in this embodiment, as shown in FIG. 9, could be exactly as described for Example 1, with the exception that the vocoder circuit is capable of collecting audio samples from the Analog to Digital Converter and transferring audio samples to the Digital to Analog Converter itself. This is done using a vocoder circuit 33 which has Direct Memory Access ("DMA"), and with which the Analog to Digital 34 and Digital to Analog 35 circuits will interface.

The Microcontroller in this Example need only transfer compressed audio data to or from the vocoder, instead of both the compressed and decompressed data.

EXAMPLE 3

Figure 10:
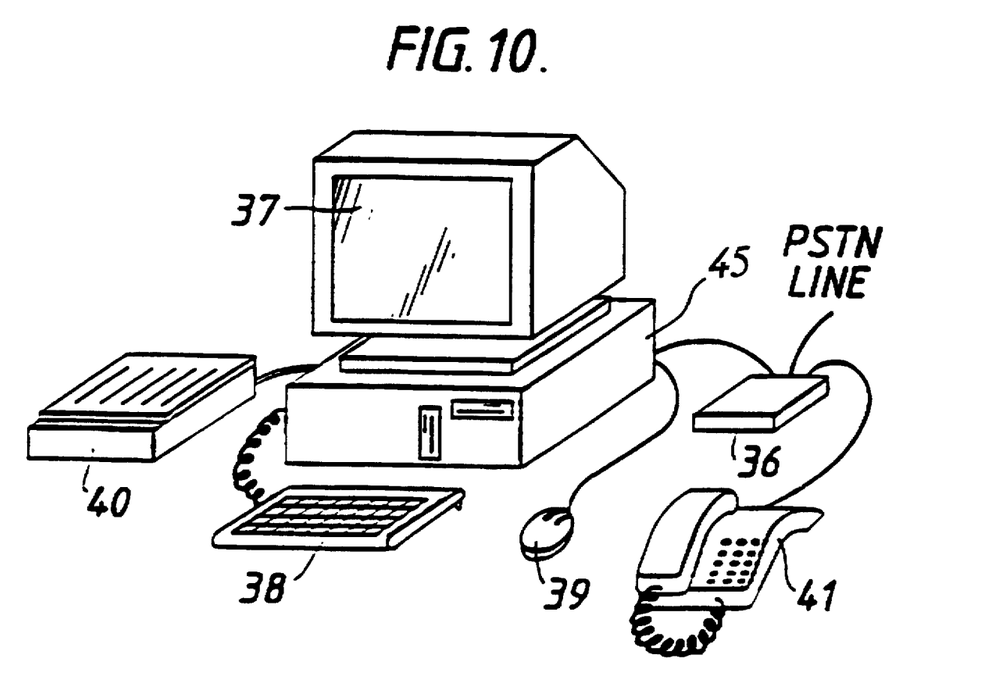
FIG. 10 shows a third embodiment of the invention (Example 3).
Figure 11:
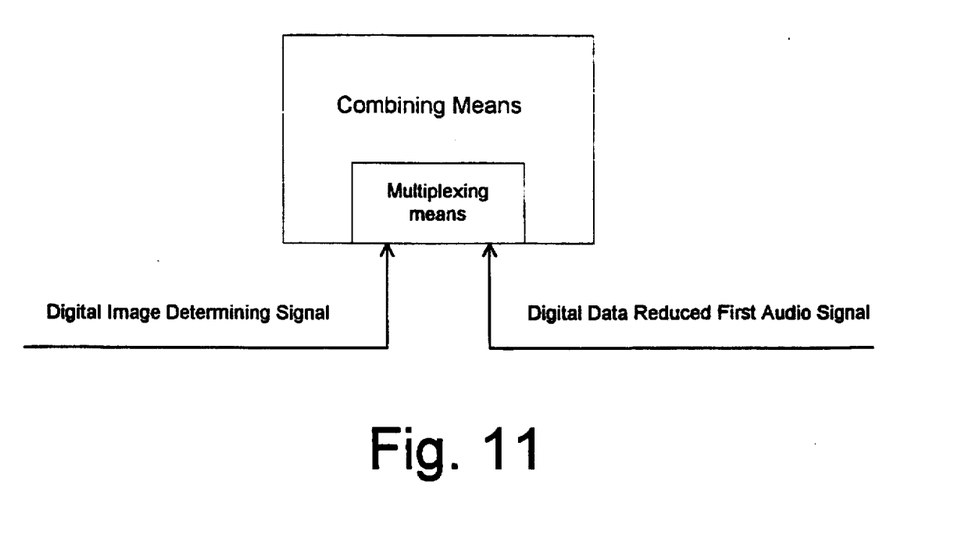
Figure 12:
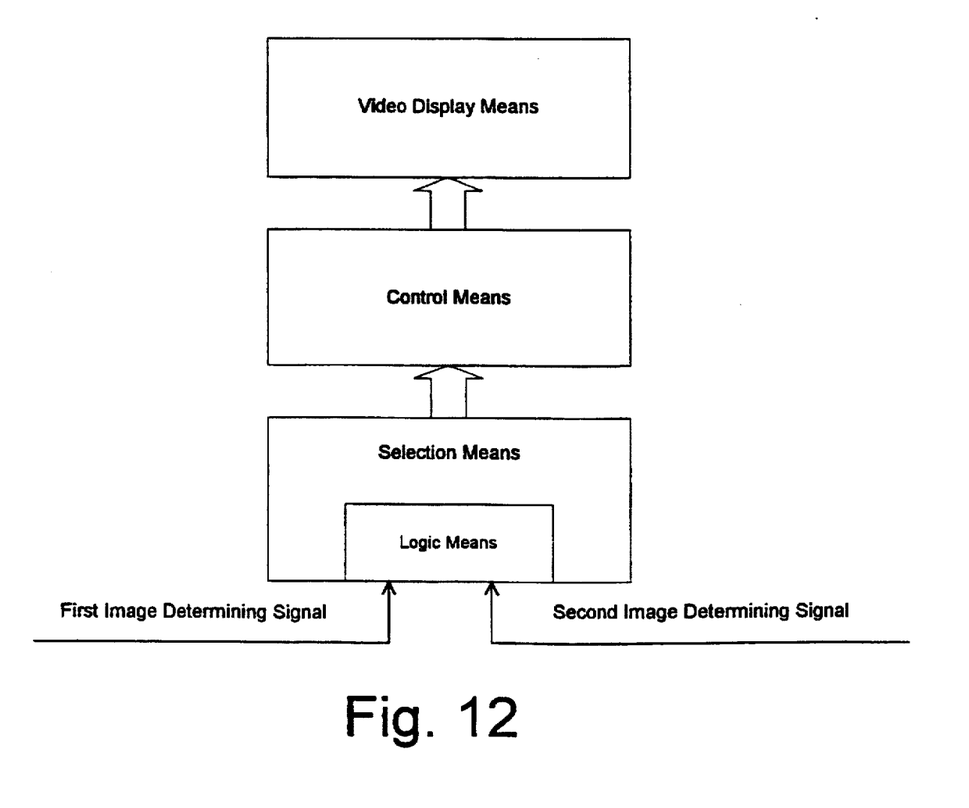

FIG. 10 depicts a complete stand alone system in the form of a complete computer system equipped with a communications board 36 exactly as described in Example 1 or Example 2.

The system has a Visual Display Unit 37 which can display graphics as well as text, in colour. Attached to the system is a keyboard 38 and a pointer device 39 (a mouse in this Example). In addition a scanner 40 is also attached so that pictures or text may be entered in.

The VDU displays a selection of options for the user to take, of which one enables the user to initiate a call to a similar system. The user may initiate a call by the use of a certain key combination on the keyboard, or by using the mouse to move a pointer on the VDU to the call option, and then depressing a button on the mouse.

The system enables the user to type in a telephone number to dial, or to select from a 'telephone book' of previously stored numbers.

Having dialled another compatible system, and successfully connected, the two users are able to talk using the telephone handset 41 at the side of each respective system. The voice connection is maintained for the duration of the call by the Boards.

In addition to the handset voice connection, the two computer systems are able to communicate at the same time. If one user moves the mouse, the pointer on both users' VDUs will move to the same position. Only one user may control the movement of the VDU pointer at a time, but the two systems automatically choose who the "owner" of the pointer is. This is achieved by the two systems cooperating in a master-slave relationship.

Initially the calling system assumes the role of master, and the called system the slave. The master has control of the VDU pointer, and checks to see if its mouse has been move since it last checked. If there has been no movement the master hands control to the slave by sending a data message though the Board, and the two reverse roles. (The master becomes the slave and vice versa). If while in the slave role the mouse has been moved, then upon gaining the master role the system waits for a short period, (say, ⅕th of a second), looking for further movement of the mouse before relinquishing control again.

If the mouse is moved while in the master role, then the VDU pointer is moved accordingly, the points through which the VDU pointer move are transmitted via the Board 36 to the other system. Control of the VDU pointer is not relinquished to the other system until the mouse is stationary and no mouse buttons are depressed.

If one of the mouse buttons is depressed and control of the VDU pointer has been gained, then that control will not be released to the other system until the mouse button is released, and the mouse is stationary.

The mouse is considered stationary if it has not been moved for more than, say, ⅕th of a second.

The graphical display provides a "canvas" upon which the users may draw and manipulate information using the VDU pointer, the system provides a painting, drawing, and editing environment for various documents — both users will see the same document, and the movements of the VDU pointer in making or editing that document.

A user may use a key combination on the keyboard, or select an option on the display to upload a document (some data, equations, text, a drawing or a picture) onto the display canvas from a storage disk in their local system, or from the scanner attached. The document is automatically transmitted to the other user's machine through the Boards when it is uploaded so that both users still see the same display.

If one user had already composed a document before dialling the other, that document is transferred when the two systems connect together.

Certain editing options allow or expect keyboard input. Key strokes are stored on one system until that system becomes the master, and then the key-strokes are transmitted to the other system while adding them to the document locally at the same time. If no further key-strokes are typed within ⅕th of a second, the systems swap roles again.

All data transferred through the communication Boards consists of a code indicating what the data is (for example: transfer of master role, movement of VDU pointer, a keystroke, or some data relating to a document), followed by the data itself. In the case of document data additional information relating to the size of the document, and the format the data is in, and how (if at all) the data is compressed is also transmitted.

I claim:

1. An interactive communication apparatus for real-time cooperative working on one or more documents containing text, image, graphical or other information shared between multiple locations, said interactive communication apparatus comprising transceiver means, said transceiver means including:
   (a) combining means for receiving a first audio signal and a first document-and-display determining signal and for combining them to produce a combined signal;
   (b) a modem for modulating a carrier waveform with the combined signal to produce a composite output signal for transmission to a second interactive communication apparatus; and
   (c) means for receiving a composite output signal from the second interactive communications apparatus and for producing therefrom a second audio signal and a second document-and-display determining signal, said interactive communication apparatus further comprising visual display means and control means coupled to receive said first and second document-and-display determining signals and to control said visual display means to produce an image determined at least in part by a selected one or both of said document-and-display determining signals.

2. An interactive communication apparatus according to claim 1, comprising a telephone set, wherein said telephone set converts sound to said first audio signal and converts said second audio signal into sound.

3. An interactive communication apparatus according to claim 1, adapted for coupling between a telephone set and a telephone line, wherein said telephone set converts sound to said first audio signal and converts said second audio signal into sound.

4. An interactive communication apparatus according to claim 2 comprising selectively operable by-pass means whereby the apparatus is selectively transparent to said telephone set.

5. An interactive communication apparatus according to claim 1 and comprising at least one ancillary transducer for permitting a user to provide said document-and-display determining signal, and, where there is more than one ancillary transducer, means for selecting which ancillary transducer provides said document-and-display determining signal.

6. An interactive communication apparatus according to claim 5 wherein a said ancillary transducer includes at least one of (a) means for scanning an original image to produce said first document-and-display determining signal representative therefrom, or (b) computing means for generating said first document-and-display determining signal, or (c) means for generating said first document-and-display determining signal corresponding to an image of predetermined form, or a blank image or (d) storage means for storing said first document-and-display determining signal.

7. An interactive communication apparatus according to claim 1 wherein said transceiver means includes compression means for compressing said first audio signal before it is combined with said first document-and-display determining signal, and means for decompressing said second audio signal.

8. An interactive communication apparatus according to claim 7 wherein said first document-and-display determining signal and said first audio signal comprise, or are converted to comprise, respective digital first document-and-display determining signal and digital first audio signal, said compression means includes means for performing data reduction on said digital first audio signal to produce a digital data reduced first audio signal, and wherein said combining means includes multiplexing means for multiplexing the first digital document-and-display determining signal and the digital data reduced first audio signal.

9. An interactive communication apparatus according to claim 8, and wherein said modem is coupled to said multiplexing means for producing said analogue output signal and for receiving an analogue signal from the second interactive communications apparatus.

10. An interactive communication apparatus according to claim 8 wherein the rate of transmission of said first document-and-display determining signal is adaptively dependent on said digital data reduced first audio signal.

11. An interactive communication apparatus according to claim 8 wherein said data reduction includes coding for silence when the level of said first audio signal falls below a threshold level for more than a predetermined period.

12. An interactive communication apparatus according to claim 11 wherein said coding for silence as received in said second audio signal is converted to a signal for white noise or other background signal.

13. An interactive communication apparatus according to claim 8 including means for adaptively controlling the rate of transmission of said analogue composite signal, or for adaptively controlling the degree of compression afforded by said compression means.

14. An interactive communication apparatus according to claim 1 and including selection means for selectively coupling one of said first and second document-and-display determining signals to said control means.

15. An interactive communication apparatus according to claim 14 wherein said selection means includes logic means for determining when either of said first and second document-and-display determining signals become capable of discernibly affecting the displayed image and for selectively coupling that one of said document-and-display determining signals which first becomes operative to said control means until that signal has ceased to be operative.

16. An interactive communication apparatus according to claim 15 wherein said determination is accomplished by determining whether a said document-and-display determining signal has changed by more than predetermined amount over a predetermined period of time, or by determining when said document-and-display determining signal has fallen within a predetermined range for a predetermined period of time.

17. An interactive communication apparatus according to claim 16 wherein at least one of said predetermined period of time and said predetermined amount and said predetermined range is selected by the user or is subject to adaptive control.

18. An interactive communication apparatus according to claim 1 and comprising means for producing a hard copy containing said image.

19. An interactive communication apparatus for real-time cooperative working on one or more documents containing text, image, graphical or other information shared between multiple locations, the apparatus adapted for use with an existing device which has visual display means, determining means for producing a first digital document-and-display determining signal, and control means coupled between said determining means and said display means and responsive to said first determining signal to control an image displayed on the display means, said interactive communication apparatus providing an interface for adapting said existing device for cooperative audio visual use with another interactive communication apparatus, and comprising transceiver means including:

(a) combining means for receiving a first audio signal and a first document-and-display determining signal and for combining them to produce a combined signal;

(b) a modem for modulating a carrier waveform with the combined signal to produce a composite output signal for transmission to a second interactive communication apparatus; and (c) means for receiving a composite output signal from the second interactive communications apparatus and for producing therefrom a second audio signal and a second document-and-display determining signal, said interactive communication apparatus further comprising visual display means and control means coupled to receive said first and second document-and-display determining signals and to control said visual display means to produce an image determined at least in part by a selected one or both of said document-and-display determining signals.

20. An interactive communication apparatus according to claim 19, comprising a telephone set, wherein said telephone set converts sound to said first audio signal and converts said second audio signal into sound.

21. An interactive communication apparatus according to claim 19, adapted for coupling between a telephone set and a telephone line, wherein said telephone set converts sound to said first audio signal and converts said second audio signal into sound.

22. An interactive communication apparatus according to claim 20 comprising selectively operable by-pass means whereby the apparatus is selectively transparent to said telephone set.

23. An interactive communication apparatus according to claim 19 and comprising at least one ancillary transducer for providing said document-and-display determining signal, and, where there is more than one ancillary transducer, means for selecting which ancillary transducer provides said document-and-display determining signal.

24. An interactive communication apparatus according to claim 23 wherein one of said ancillary transducers includes (a) means for scanning an original image to produce said first document-and-display determining signal representative therefrom, or (b) computing means for generating said first document-and-display determining signal, or (c) means for generating said first document-and-display determining signal corresponding to an image of predetermined form, or a blank image or storage means for storing a said first document-and-display determining signal.

25. An interactive communication apparatus according to claim 19 wherein said transceiver means includes compression means for compressing said first audio signal before it is combined with said first document-and-display determining signal, and means for decompressing said second audio signal.

26. An interactive communication apparatus according to claim 25 wherein said first document-and-display determining signal and said first audio signal comprise, or are converted to comprise, respective digital first document-and-display determining signal and digital first audio signal, said compression means includes means for performing data reduction on said digital first audio signal to produce a digital data reduced first audio signal, and wherein said combining means includes multiplexing means for multiplexing the first digital document-and-display determining signal and the digital data reduced first audio signal.

27. An interactive communication apparatus according to claim 26, and for receiving an analogue signal from the second interactive communication apparatus.

28. An interactive communication apparatus according to claim 26 wherein the rate of transmission of said first document-and-display determining signal is adaptively dependent on said digital data reduced first audio signal.

29. An interactive communication apparatus according to claim 26 wherein said data reduction includes coding for silence when the level of said first audio signal falls below a threshold level for more than a predetermined period.

30. An interactive communication apparatus according to claim 29 wherein said coding for silence as received in said second audio signal is converted to a signal for white noise or other background signal.

31. An interactive communication apparatus according to claim 26 including means for adaptively controlling the rate of transmission of said analogue composite signal, or for adaptively controlling the degree of compression afforded by said compression means.

32. An interactive communication apparatus according to claim 29 and including selection means for selectively coupling one of said first and second document-and-display determining signals to said control means.

33. An interactive communication apparatus according to claim 32 wherein said selection means includes logic means for determining when either of said first and second document-and-display determining signals become capable of discernibly affecting the displayed image and for selectively coupling that one of said document-and-display determining signals which first becomes operative to said signal has ceased to be operative.

34. An interactive communication apparatus according to claim 33 wherein said determination is accomplished by determining whether said document-and-display determining signal has changed by more than a predetermined amount over a predetermined period of time, or by determining when said document-and-display determining signal has fallen within a predetermined range for a predetermined period of time.

35. An interactive communication apparatus according to claim 34 wherein at least one of said predetermined period of time and said predetermined amount and said predetermined range is selected by the user or is subject to adaptive control.

36. An interactive communication apparatus according to claim 19 and comprising means for producing a hard copy containing said image.

37. An audio visual system comprising at least two interactive communication apparatuses each according to claim 1 with their transceiver means coupled to allow transmission of said composite analogue signals therebetween, whereby changes effected in the display associated with one apparatus are detected and reproduced on the display associated with the other apparatus.

38. An audio visual system comprising at least two interactive communication apparatuses each according to claim 19 with their transceiver means coupled to allow transmission of said composite analogue signals therebetween, whereby changes effected in the display associated with one apparatus are detected and reproduced on the display associated with the other apparatus.

39. An audio visual system comprising an interactive communication apparatus according to claim 1 and an interactive communication apparatus for use with an existing device which has visual display means, determining means for producing a first document-and-display determining signal, and control means coupled between said display means and responsive to said first determining signal to control an image displayed on the display means, said interactive communication apparatus providing an interface for adapting said existing device for cooperative audio visual use with another interactive communication apparatus, and comprising transceiver means including:

(a) combining means for insertion between said determining means and said control means for accepting said first document-and-display determining signal and combining it with a first audio signal to produce a composite analogue output signal for transmission to a second interactive communication apparatus, and (b) means for receiving an analogue signal and producing therefrom a second audio signal and a second document-and-display determining signal, said interactive communication apparatus being adapted to selectively supply to said control means said second document-and-display determining signal said first document-and-display determining signal, or both said first and said second document-and-display determining signals, characterized in that said combining means is arranged to combine said first audio signal and said first document-and-display determining signal to produce a digital composite signal, and said interactive communication apparatus comprises a modem for converting said digital composite signal to said analogue composite signal: with the transceiver means of the interactive communication device of claim 1 and the interactive communication apparatus for use with an existing device coupled to allow transmission of said composite analogue signals therebetween, whereby changes effected in the display associated with one apparatus may be detected and reproduced on the display associated with the other apparatus.

40. The interactive communication apparatus of claim 1 wherein the digital composite signal is assembled into packets.

41. The interactive communication apparatus of claim 40 wherein a single packet contains a frame of voice data and as much document-and-display determining data as can be sent before a subsequent frame of voice data is ready for transmission, whereby the higher priority of voice data provides for the transmission of uninterrupted speech, with the document-and-display determining data being combined into packets with speech data as packet space is available.

42. The interactive communication apparatus of claim 40 wherein a single packet contains compressed voice data and document-and-display determining data.

43. The interactive communication apparatus of claim 42 in which the voice data and document-and-display determining data are separately identifiable in the packet.

44. The interactive communication apparatus of claim 40 wherein the packets are of variable length and the length of each packet is indicated by a set of bits in a predetermined packet position.

45. The interactive communication apparatus of claim 40 wherein the first audio signal is allocated a varying proportion of each packet and document-and-display determining data is appended to the audio data in available space.

* * * * *